United States Patent
Howes et al.

(10) Patent No.: US 10,235,220 B2
(45) Date of Patent: Mar. 19, 2019

(54) MULTITHREADED COMPUTING

(75) Inventors: Lee W. Howes, Austin, TX (US); Benedict R. Gaster, Santa Cruz, CA (US); Michael Clair Houston, Cupertino, CA (US); Michael Mantor, Orlando, FL (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 480 days.

(21) Appl. No.: 13/606,741

(22) Filed: Sep. 7, 2012

(65) Prior Publication Data

US 2013/0191852 A1     Jul. 25, 2013

Related U.S. Application Data

(60) Provisional application No. 61/589,468, filed on Jan. 23, 2012.

(51) Int. Cl.
| | |
|---|---|
| G06F 3/00 | (2006.01) |
| G06F 9/44 | (2018.01) |
| G06F 9/46 | (2006.01) |
| G06F 13/00 | (2006.01) |
| G06F 9/54 | (2006.01) |
| G06F 9/48 | (2006.01) |

(52) U.S. Cl.
CPC ............ *G06F 9/542* (2013.01); *G06F 9/4843* (2013.01)

(58) Field of Classification Search
None
See application file for complete search history.

(56) References Cited

U.S. PATENT DOCUMENTS

| | | | |
|---|---|---|---|
| 5,630,074 A * | 5/1997 | Beltran ................. | G06F 9/4881 719/314 |
| 7,490,178 B2 * | 2/2009 | van Doren et al. ............ | 710/52 |
| 7,549,151 B2 * | 6/2009 | Zhou et al. .................... | 719/313 |
| 7,950,017 B1 * | 5/2011 | Cain ....................... | G06F 9/545 719/310 |
| 8,059,299 B2 * | 11/2011 | Sugishita ........... | H04N 1/32358 358/1.16 |
| 8,621,184 B1 * | 12/2013 | Radhakrishnan et al. .... | 712/220 |

(Continued)

FOREIGN PATENT DOCUMENTS

| | | |
|---|---|---|
| JP | 2003-029980 A | 1/2003 |
| JP | 2006-525578 A | 11/2006 |

OTHER PUBLICATIONS

Khronos OpenCL Working Group, "The OpenCL Specification", Jun. 1, 2011, Khronos Group, pp. 1-385.*

(Continued)

*Primary Examiner* — Reginald G Bragdon
*Assistant Examiner* — Kimbleann C Verdi
(74) *Attorney, Agent, or Firm* — Volpe and Koenig, P.C.

(57) ABSTRACT

A system, method, and computer program product are provided for improving resource utilization of multithreaded applications. Rather than requiring threads to block while waiting for data from a channel or requiring context switching to minimize blocking, the techniques disclosed herein provide an event-driven approach to launch kernels only when needed to perform operations on channel data, and then terminate in order to free resources. These operations are handled efficiently in hardware, but are flexible enough to be implemented in all manner of programming models.

18 Claims, 6 Drawing Sheets

(56) References Cited

U.S. PATENT DOCUMENTS

| | | |
|---|---|---|
| 8,694,625 B2 * | 4/2014 | Jennings et al. .............. 709/224 |
| 2006/0182137 A1 | 8/2006 | Zhou et al. |
| 2008/0062450 A1 | 3/2008 | Sugishita et al. |

OTHER PUBLICATIONS

Munshi, A. "The OpenCL Specification—version 1.1—document revision 44," p. 12-151, Khronos Group (2011).

Petriu, D., "A Pattern Language for Improving the Capacity of Layered Client/Server Systems with Multi-Threaded Servers", *Proc. of European Conference on Pattern Languages of Programming(EuroPLoP'97)*, Germany (1997).

Schmidt, D. C., "Evaluating Architectures for Multithreaded Object Request Brokers", *Communications of the ACM* 41(10):54-60, Association for Computing Machinery, Inc., United States (1998).

International Search Report and Written Opinion for International Application No. PCT/US2013/022729, European Patent Office, Netherlands, dated Apr. 22, 2013.

Office Action dispatched Feb. 21, 2017, in Japanese Patent Application No. 2014-553528, Mr. Hayakawa Yuji et al., drafted Feb. 9, 2017 with English Language Translation.

"Java Programming Learning based on Theory", Java World vol. 7, Issue 4, IDC Japan, Apr. 1, 2003; pp. 120-122 (as listed in the Japanese Office Action dated Feb. 21, 2017 for the Japanese Patent Application No. 2014-553528).

Office Action dated May 2, 2017, in Chinese Patent Application No. 201380006344.7.

Anonymous: "Excerpt from MQSeries Application Programming Guide—Chapter 14. Starting MQSeries applications using triggers"; Nov. 2000, pp. 191-211; XP055503135; Retrieved from the Internet: URL:ftp://ftp.software.ibm.com/software/ts/mqseries/library/books/csqzal05.pdf [retrieved on Aug. 29, 2018].

\* cited by examiner

Prior Art

MULTITHREADED COMPUTING

CROSS-REFERENCE TO RELATED APPLICATIONS

The present application claims the benefit of U.S. Provisional Patent Application No. 61/589,468, filed Jan. 23, 2012, entitled "Efficient Channel Operation for Heterogeneous Computing," which is incorporated by reference herein in its entirety.

BACKGROUND OF INVENTION

Field of the Invention

The invention relates generally to software programming and, more particularly, to multithreaded programming techniques.

Description of the Background Art

Many high-performance computing applications are written using multithreading techniques. When using a multithreading technique, multiple threads of execution can work on different tasks either concurrently or by alternating access to a processing pipeline. For example, if a task can be broken down into two distinct sub-tasks, it may be useful to create two separate threads, each one handling a different sub-task. These threads then produce their corresponding results, which together solve the overall task.

Different techniques exist for assigning work to a task. One approach is commonly termed, "producer-consumer design." Within a producer-consumer design approach, one or more threads are responsible for producing data, and one or more threads are responsible for consuming the produced data. As an example, a producer thread may be responsible for reading data from a file into a memory area accessible by a consumer thread. The consumer thread retrieves the data from that memory area and processes (consumes) the data as needed.

As the responsibilities of consumer threads become more complex, the consumer thread's resource requirements also typically become more complex. In the producer-consumer design approach, consumer threads are available to handle data as data arrives into the memory area from the producer thread. This requirement for consumer threads to remain resident in memory requires excessive resource utilization. Additionally, swapping consumer threads in and out of active memory is also expensive (with respect to, for example, excessive processing cycles, time to completion, power, and other aspects), even in situations when a consumer thread may not be performing any operations if the memory area is empty.

Accordingly, what is desired is a technique to reduce the resource requirements of consumer threads.

SUMMARY OF EMBODIMENTS OF THE INVENTION

An embodiment of the invention includes a method including defining a channel, defining a consumer kernel configured to read data from the channel, defining a producer kernel configured to write data to the channel, and registering a channel event configured to launch the consumer kernel when a condition of the channel is satisfied.

Another embodiments of the invention includes a computer-readable storage device having instructions stored thereon, execution of which, by a computing device, causes the computing device to perform operations comprising defining a channel, defining a consumer kernel configured to read data from the channel, defining a producer kernel configured to write data to the channel, and registering a channel event configured to launch the consumer kernel when a condition of the channel is satisfied.

A further embodiment of the invention includes a system having, a memory configured to store modules comprising a channel, a consumer kernel configured to read data from the channel, a producer kernel configured to write data to the channel, and a registration module configured to register a channel event, wherein the channel event is configured to launch the consumer kernel when a condition of the channel is satisfied, and one or more processors configured to process the modules.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the invention and, together with the description, further serve to explain the principles of the invention and to enable a person skilled in the relevant art to make and use the invention.

The invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

The following detailed description of the invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that aspects of the invention, as described below, can be implemented in many different embodiments of software, hardware, firmware, and/or the entities illustrated in the figures. Any actual software code with the specialized control of hardware to implement the invention is not limiting of the invention. Thus, the operational behavior of the invention will be described with the understanding that modifications and variations of the embodiments are possible, given the level of detail presented herein.

Additionally, and as will be apparent to one of ordinary skill in the art, the simulation, synthesis and/or manufacture of the various embodiments of this invention may be accomplished, in part, through the use of computer readable code (as noted above), including general programming languages (such as C or C++), hardware description languages (HDL) including Verilog HDL, VHDL, Altera HDL (AHDL) and so on, or other available programming and/or schematic capture tools (such as circuit capture tools). This computer readable code can be disposed in any known computer usable medium including semiconductor, magnetic disk, optical disk (such as CD-ROM, DVD-ROM) and as a computer data signal embodied in a computer usable (e.g., readable) transmission medium (such as a carrier wave or any other medium including digital, optical, or analog-based medium). As such, the code can be transmitted over communication networks including the Internet and internets. It is understood that the functions accomplished and/or structure provided by the systems and techniques described above can be represented in a core (such as a graphics processing unit (GPU) core) that is embodied in program code and may be transformed to hardware as part of the production of integrated circuits. As will be appreciated, other types of cores or processing units can provide the functions and/or structure embodying aspects of the present invention. These processing units may include, for example, central processing units (CPUs), the aforementioned graphics processing units, digital signal processors, application processors and the like.

Reference to modules in this specification and the claims means any combination of hardware or software components for performing the indicated function. A module need not be a rigidly defined entity, such that several modules may overlap hardware and software components in functionality. For example, a software module may refer to a single line of code within a procedure, the procedure itself being a separate software module. One skilled in the relevant arts will understand that the functionality of modules may be defined in accordance with a number of stylistic or performance-optimizing techniques, for example.

Figure 1:
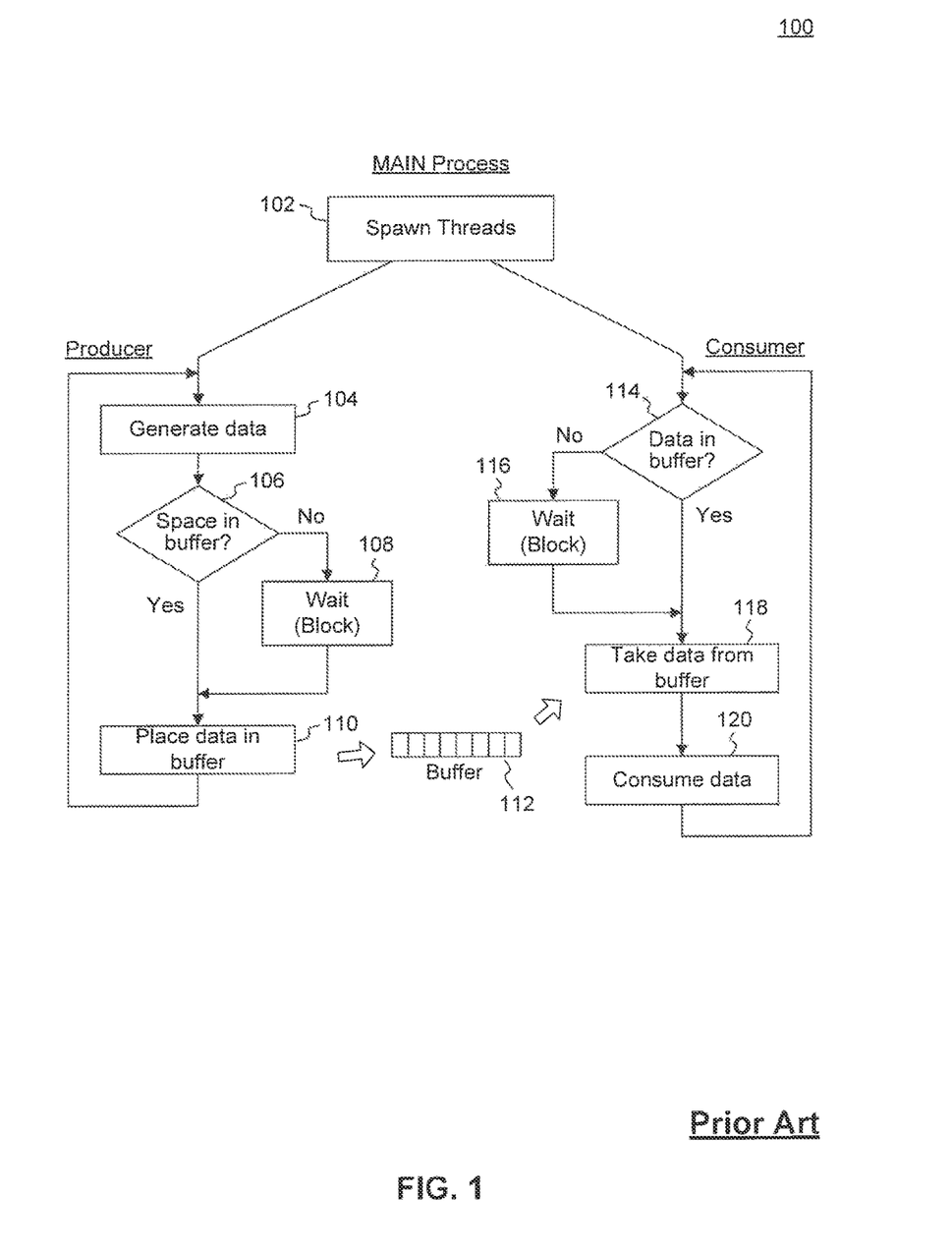
FIG. 1 is an example multithreaded application using existing techniques.

FIG. 1 is an example multithreaded application 100 using existing techniques. In this example, a main process spawns threads at step 102, specifically one or more producer threads and one or more consumer threads are spawned in accordance with a producer-consumer design approach. One skilled in the relevant arts will appreciate that other threading models exist and are relevant to this disclosure, and the producer-consumer design approach is used by way of example here and elsewhere in this disclosure.

A producer thread is tasked with generating data in step 104. For example, the producer thread may read data from a file or database. This data could be anything that application 100 is configured to process, such as a graphic made up of a set of lines. For the purpose of this example, it is assumed that processing on a line or other set of data from a graphic file can be handled in parallel with processing other lines or sets of data.

At step 106, the producer determines whether there is space in a buffer 112 to place data. If not, the producer waits until space becomes available, as indicated in step 108. This waiting state where a thread is unable to perform further processing until a resource becomes available is sometimes known as "blocking." While blocking, the thread continues to use system resources despite not performing any useful work.

Once the resource (in this case buffer 112) becomes available, the producer places the data in the buffer 112 in step 110. The producer then continues back to step 104 to produce any additional data (e.g., an additional image line from a graphic file).

The consumer thread is tasked with processing data that the producer places in buffer 112. Multiple producers and multiple consumers can be used in a producer-consumer design approach; although in practice consumers tend to outnumber producers, as the consumer threads are responsible for more time-consuming processing.

Continuing this example of a producer-consumer design approach, a consumer thread is provided to perform work on an individual line or other set of data from a graphic file. In one embodiment, the consumer thread is able to perform this work independently of the other data from a graphic file in a true parallel operation. For example, consumer threads may be used to reduce the color space (number of bits allocated per pixel) of a graphic, and each can do so on corresponding data of the graphic. One skilled in the relevant art will again appreciate that this application is provided by way of example, and not limitation.

In order to perform its work, the consumer thread determines whether there is data in buffer 112 to work on at step 114. If there is no data available, the consumer thread is unable to proceed and must wait (block) as indicated in step 116. As discussed above, the consumer thread continues to utilize system resources while blocking until data becomes available in buffer 112.

Various mechanisms exist for thread blocking. For example, a thread can test a condition and block until that condition is satisfied (e.g., test whether a buffer has data, test for a lock, etc.). When that condition is satisfied, the thread can then proceed. In this case, the thread proceeds to step 118 to retrieve data from buffer 112. The thread then consumes the data at step 120 by processing the data (e.g., reducing the color space of a line of graphic data). The consumer thread then returns to step 114, and is ready to handle additional work.

A significant problem with this approach described in method 100 is the significant resource utilization by threads while in a blocking state (e.g., steps 108 and 116 above), even though no useful work is being performed. This can be ameliorated to some extent in context-switching processors by switching the blocked threads out of the processing pipeline to enable other threads to utilize some of the processing resources. Even so, context switching requires retention of per-thread state information for the threads that have been switched out, so that their state information is preserved when they are switched back in. Additionally, not all processors are able to perform the necessary context-switching operations, such as many GPUs that are nevertheless capable of multithreaded programming.

As a result, traditional implementations where one thread writes and another thread reads, while blocking the reading thread on an empty channel, is not an efficient approach. This leads to long-running threads that occupy system resources, and may need to be switched out by a scheduler. Additionally, even if switched out, these threads continue to consume resources to retain per-thread state information.

Figure 2:
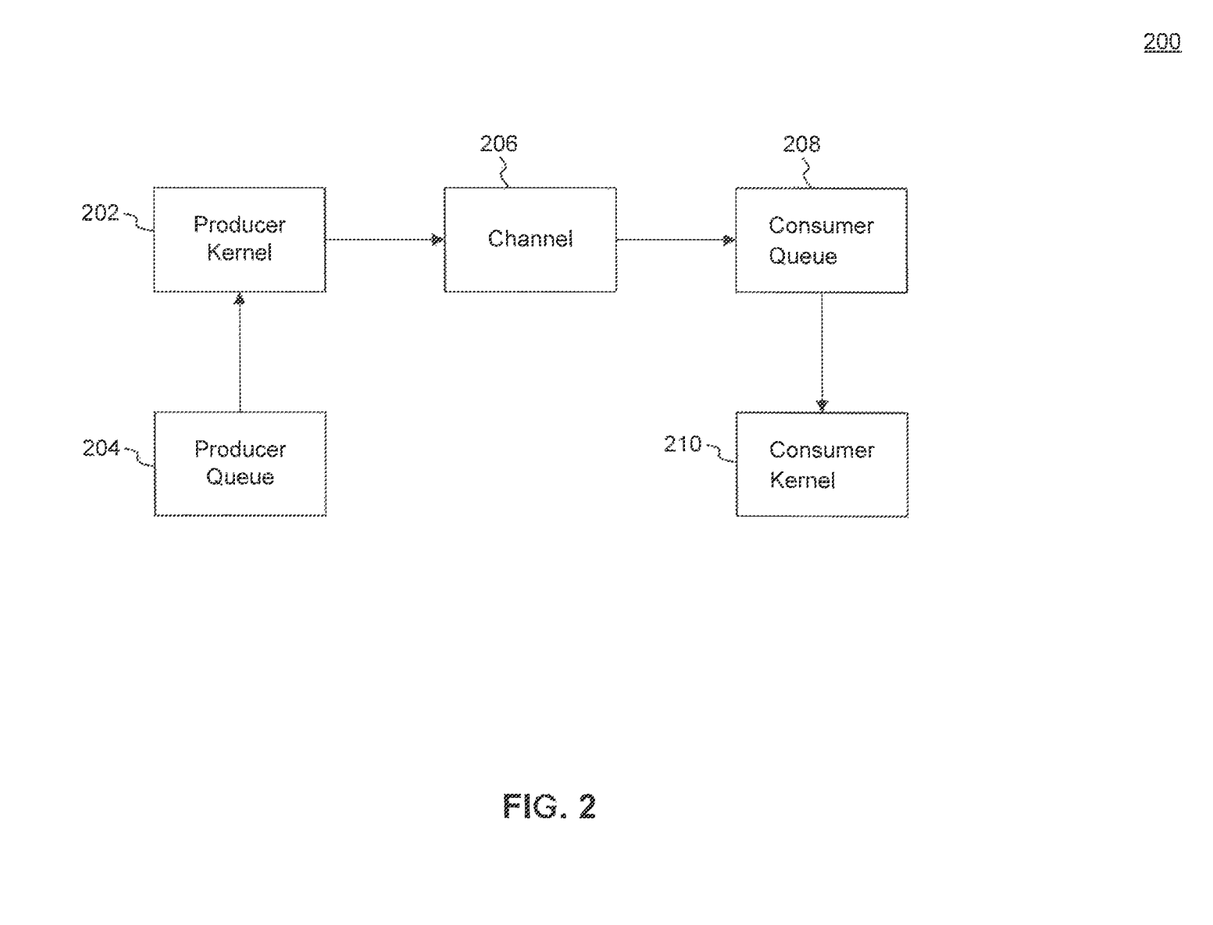
FIG. 2 illustrates a multithreaded application, in accordance with an embodiment of the invention.

FIG. 2 illustrates a multithreaded application 200, in accordance with an embodiment of the invention. Multithreaded application 200, and the techniques embodied therein, provides a solution to the inefficiencies of the existing resource utilization problem associated with thread blocking. Again, discussion herein is presented in the context of the producer-consumer model, but one skilled in the relevant arts will appreciate the applicability of this technique to other multithreading models in which blocking may occur.

Multithreaded application 200 provides a producer kernel 202 and a consumer kernel 210, in accordance with an embodiment of the invention. By way of non-limiting example, implementation details herein are discussed in the context of the OpenCL parallel programming standard developed by the Khronos Group. However, one skilled in the relevant arts will appreciate the applicability of these techniques to other development platforms.

Producer kernel 202 and consumer kernel 210 are code blocks corresponding to a producer task and a consumer task, respectively, using OpenCL "kernel" terminology. In OpenCL, a kernel is a task that is handled by a thread or a set of parallel threads. An OpenCL runtime will place kernels to be executed on a command-queue, queuing that kernel (thread) for execution on a particular device. The flexibility of OpenCL permits queuing of kernels to a large number of processing devices, including both CPUs and GPUs. As will be appreciated, APIs other than OpenCL could also be employed. For example, DirectCompute™ from Microsoft Corporation is another API that could be employed.

To illustrate the flow of data by producer kernel 202 and consumer kernel 210, FIG. 2 further illustrates the use of a producer queue 204 and a consumer queue 208, in accordance with an embodiment of the invention. Producer queue 204 need not be a literal queue, but rather is some sort of data source that the producer kernel 202 reads from in order to provide work for execution as one or more consumer kernels 210, in accordance with an embodiment of the invention. Referring back to the earlier example, a file containing lines of graphic data could be treated as producer queue 204, with the producer kernel 202 reading lines of graphic data from the file. One skilled in the relevant arts will appreciate that other data sources can be utilized, and producer queue 204 is provided by way of example, and not limitation.

Similarly, consumer queue 208 need not be a literal queue, but rather represents some destination for work processed by consumer kernel 210, in accordance with an embodiment of the invention. Referring back to the earlier example, each consumer kernel 210 pulls an individual line of graphic data off of consumer queue 208 and processes it, in accordance with an embodiment of the present invention. Multiple consumer kernels 210 can do so for their respective work. One skilled in the relevant arts will appreciate that other sources of work for consumer kernel 210 may be used, and consumer queue 208 is provided by way of example, and not limitation.

Instead of using the simple buffer example of FIG. 1, multithreaded application 200 introduces channel 206, in accordance with an embodiment of the invention. Channel 206, together with supporting functionality, provide the ability to eliminate blocking by consumer threads.

Channel 206 is not a single buffer or queue, but instead provides a more sophisticated communication pathway between producer kernel 202 and consumer queue 208 that permits the registration of a kernel launch trigger in association with the channel. This kernel launch trigger will launch consumer kernel 210 when a condition is met, such as the presence of work in consumer queue 208.

Figure 3:
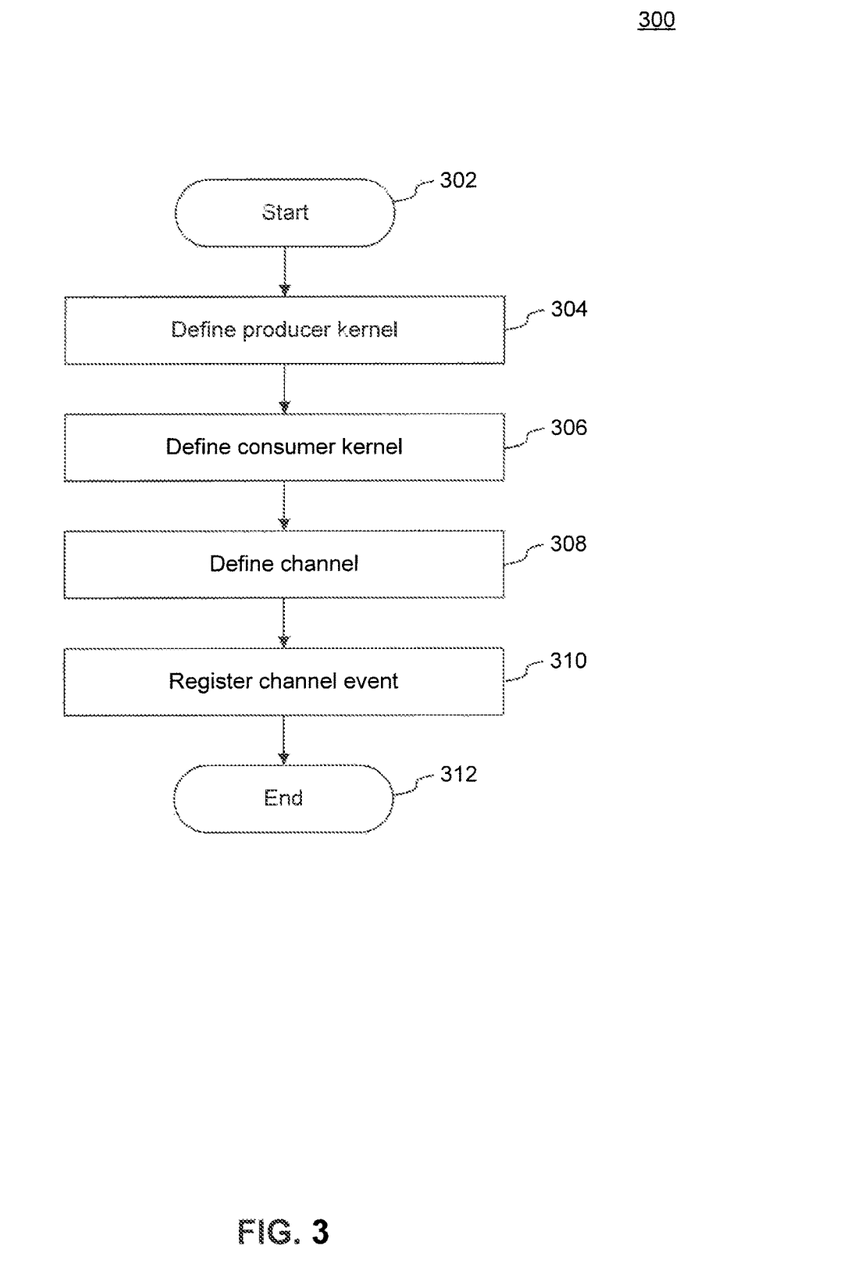
FIG. 3 is a flowchart illustrating operations by which a multithreaded application is developed, in accordance with an embodiment of the invention.

FIG. 3 is a flowchart of method 300 illustrating operations by which a multithreaded application is developed to take advantage of this approach, in accordance with an embodiment of the invention. The method begins at step 302 and proceeds to step 304 where a producer kernel is defined. By way of non-limiting example, using OpenCL syntax that has been extended to accommodate the novel channel and event handling concepts disclosed herein, a producer kernel could be defined in the following manner:

```
kernel void A (global const int *a, write_only channel int b,
write_only channel int c)
{
    int n = a[get_global_id(0)];
    if (n > 5) {
        write_channel(b,n);
    } else {
        write_channel(c,n);
    }
}
```

In this example producer kernel, two separate channels are written to. Each channel is populated with data retrieved from array "a" (i.e., the producer queue 204) by the producer kernel given a condition, such as in the current example, whether the data value is greater than 5 or not.

At step 306, a consumer kernel is defined, in accordance with an embodiment of the invention. Continuing the above non-limiting example with extended OpenCL syntax, a consumer kernel is defined for each channel being used (channels b and c). In an embodiment of the invention, these consumer kernels are defined in the following manner:

```
kernel void B (read_only channel int b, global int *sumB)
{
    int val;
    read_channel(b, &val);
    atomic_add(sumB, val);
}
kernel void C (read_only channel int c, global int *sumC)
{
    int val;
    read_channel(c, &val);
    atomic_add(sumC, val);
}
```

In the above example consumer kernels, each kernel performs the similar task of reading an integer value from its respective channel and adding that value to a global integer value (i.e., the consumer queue 210).

At step 308, the channel is defined in accordance with an embodiment of the invention. At step 310, a channel event is registered to trigger actions when certain conditions of the channel are met.

Continuing the above non-limiting example with extended OpenCL syntax, two channels (channelB and channelC) are defined at step 308, along with corresponding event triggers. These channels and events could be defined in the following manner:

```
cl_event channelBTrigger;
cl_event channelCTrigger;
cl_mem channelB = clCreateChannel(
    context,
    0,              // Flags
    10000,          // Size in elements
    sizeof(int)     // Element size
    10,             // Trigger batch size
```

```
        &channelBTrigger,         // Event to set state on
        &err
    );
    cl_mem channelC = clCreateChannel(
        context,
        0,                        // Flags
        10000,                    // Size in elements
        sizeof(int)               // Element size
        10,                       // Trigger batch size
        &channelCTrigger,         // Event to set state on
        &err
    );
```

In the above example, the channels are created with certain size parameters and an indication of an event handler to use when a particular channel condition is met. By way of non-limiting example, a programming language compiler, such as the compiler for OpenCL, is extended to handle the creation of channel objects as above by the following function:

```
            cl_mem clCreateChannel(
                cl_context context,
                cl_channel_flags flags,
                cl_uint number_of_elements,
                cl_uint element_size_in_bytes,
                cl_unit block_size,
                cl_event block_ready_event,
                cl_int * errcode_ret);
```

In this exemplary non-limiting definition, the parameters take on the following usage:

context is a valid OpenCL context used to create the channel object flags is a bit-field that is used to specify allocation and usage information about the channel memory object being created number_of_elements refers to the number of elements element_size is the size of the element type in bytes.

block_size is the number of elements after which a CL_CHANNEL_BLOCK_READY state will be set in block ready event.

errcode_ret will return an appropriate error code—if errcode_ret is NULL, no error code is returned.

Continuing with the exemplary non-limiting definition, errorcode ret can be utilized to return the condition CL_SUCCESS if the function executed successfully, or otherwise it returns a NULL value with one of the following exemplary error values:

CL_INVALID_CONTEXT if context is not a valid context

CL_INVALID_VALUE if values specified in flags are not valid

CL_INVALID_CHANNEL_SIZE if size if it exceeds the value specified in CL_DEVICE_CHANNEL_MAX_SIZE CL_MEM_OBJECT_ALLOCATION_FAILURE if there is a failure to allocate memory for image object CL_INVALID_OPERATION if there are no devices in context that support channels CL_OUT_OF_RESOURCES if there is a failure to allocate resources required by the OpenCL implementation on the device CL_OUT_OF_HOST_MEMORY if there is a failure to allocate resources required by the OpenCL implementation on the host With the event triggers defined and associated with their corresponding channels, they are registered as in step 310 for when a particular event condition is met. Continuing the above non-limiting example, the two event triggers are registered in the following manner:

```
            clAddEventTrigger(
                highPriorityQueue, kernelB, 1, 0, ndRange, 0, 2, eventPairB,
                CL_CHANNEL_BLOCK_READY, 0);
            clAddEventTrigger(
                highPriorityQueue, kernelC, 1, 0, ndRange, 0, 2, eventPairC,
                CL_CHANNEL_BLOCK_READY, 0);
```

The above exemplary event trigger registrations will trigger on the CL_CHANNEL_BLOCK_READY condition, which is set when there is at least one block of data in the channel as measured by the block_size value passed into clCreateChannel, as discussed above. Another event, CL_CHANNEL_FULL, could instead be utilized for other applications, which is set when the channel is fall as measured by the channel's size value. One skilled in the relevant arts will appreciate that the event trigger functionality can be extended as desired, and these events are provided by way of example, and not limitation.

In the case of OpenCL, event trigger creation is handled by defining the function clAddEventTrigger, in accordance with an embodiment of the invention. An exemplary non-limiting definition of this function would be:

```
            void clAddEventTrigger(
                cl_command_queue queue,
                cl_kernel kernel,
                cl_uint work_dims,
                const size_t *global_work_offset,
                const size_t *global_work_size,
                const size_t *localwork_size,
                cl_unit num_events_in event_list,
                const cl_event event_list,
                cl_uint event_trigger_state,
                cl_event *event,
                cl_int *errcode_ret);
```

In this exemplary non-limiting definition, the parameters take on the following usage:

queue is a valid OpenCL Command queue into which the kernel is enqueued kernel is a valid OpenCL kernel to enqueue a num_events in event list refers to the number of events that will be examined to assess the trigger event_trigger_state is the state mask for the set of valid states on which the kernel launch will occur, and can be from the normal set of OpenCL event states with the addition of the new states described above event event describing the state of the launched kernel Method 300 then ends at step 312. The order of the steps described in FIG. 3 and elsewhere in the figures need not be fixed, as programs may be written with, definitions appearing in various orders and locations in the code.

Figure 4:
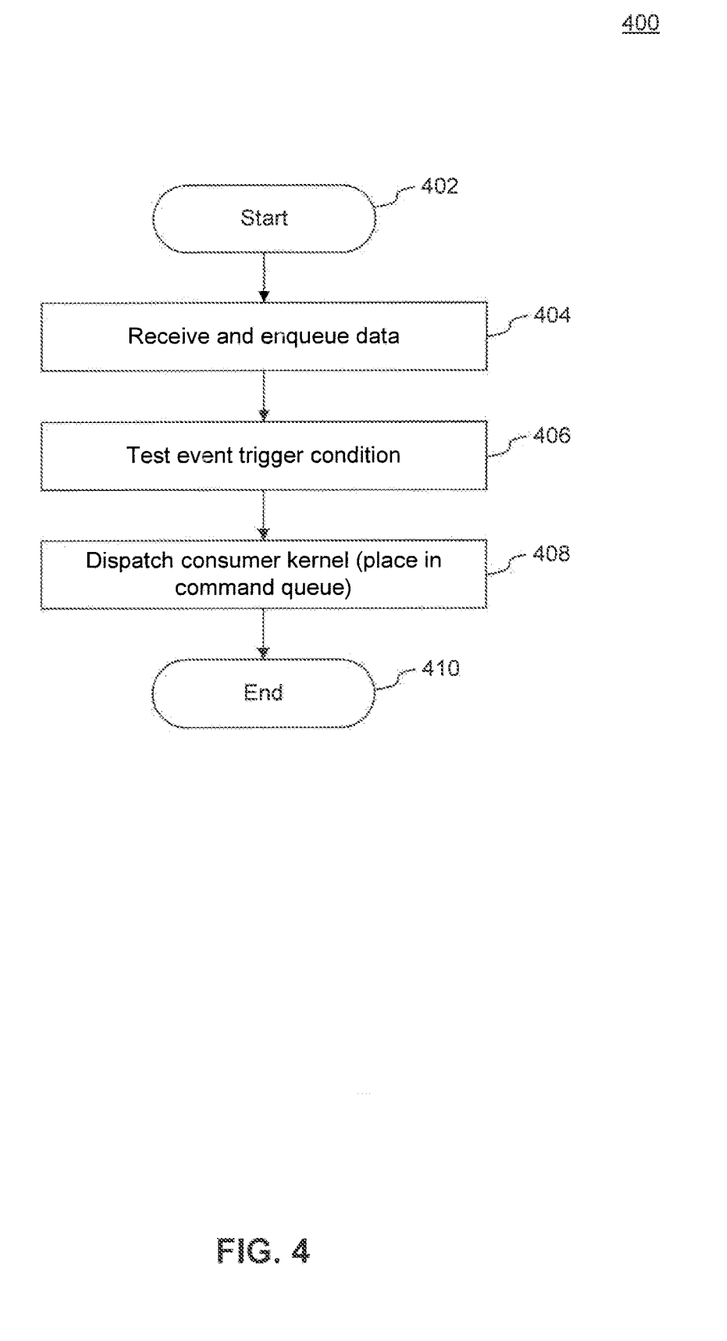
FIG. 4 is a flowchart illustrating operation of extended channel and event handling in accordance with an embodiment of the invention.

FIG. 4 is a flowchart of Method 400 illustrating the operation of the extended channel and event handling in accordance with an embodiment of the invention. The method begins at step 402 and proceeds to step 404 where data to be processed is received and stored in the channel (e.g., placed into a queue within the channel). At step 406, an event trigger condition for the channel is tested. For example, as described above, this condition may be the CL_CHANNEL_BLOCK_READY condition, which is set when there is at least one block of data in the channel.

If the condition tests affirmatively, then a corresponding consumer kernel is dispatched at step 408 into the command queue, in accordance with an embodiment of the invention. In the above example, if a block of data is available in "channelB", then kernelB is launched to consume the data. The method ends at step 410.

The effect of this approach is to avoid having consumer kernels idling or switched out while blocking. Instead, consumer kernels are instantiated only when needed, and terminated after their work is done. While this disclosure presents this application in the context of creating consumer kernels on-the-fly, one skilled in the relevant arts will appreciate that the channel event handling disclosed herein can be applied to dispatch kernels for other applications. For example, an event trigger can be used to dispatch a producer kernel when space becomes available in a fall channel, preventing blocking of the producer kernel while waiting for space.

Figure 5:
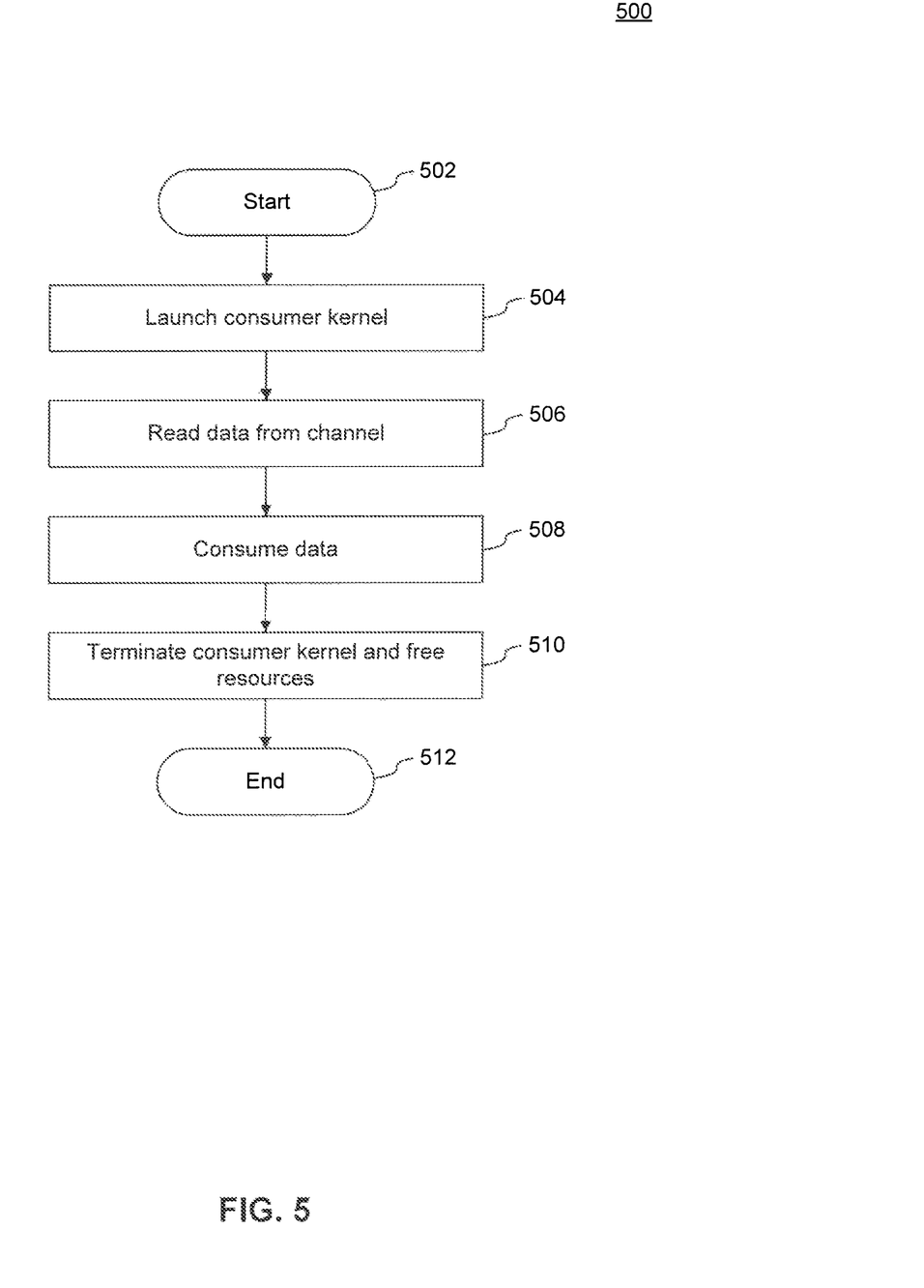
FIG. 5 is a flowchart illustrating the operation of a consumer kernel consistent with an exemplary producer-consumer implementation, in accordance with an embodiment of the invention.

FIG. 5 is a flowchart of Method 500 illustrating the operation of a consumer kernel consistent with an exemplary producer-consumer implementation, in accordance with an embodiment of the invention. The method begins at step 502 and proceeds to step 504 where the consumer kernel is launched. In accordance with an embodiment of the invention, the consumer kernel is launched from the command queue in an OpenCL implementation, although other techniques for launching the kernel may be used according to particular implementations in other programming models.

At step 506, the consumer kernel reads data from the channel, and consumes the data at step 508. The amount of work required to consume the data will vary with the particular implementation. However, reducing the resources needed by an individual consumer kernel to consume the data is generally preferred. When the consumer kernel completes its work on the data, the consumer kernel terminates and frees its resources at step 510. The method then ends at step 512.

In order to improve performance of the techniques described herein, certain optimizations to a programming language compiler (e.g., the OpenCL compiler) or runtime system are contemplated in accordance with an embodiment of the invention. For example, when compiling for execution on a GPU, the compiler may optimize channels for representation in some level of GPU memory at runtime, such as in global memory (e.g., DRAM). Alternatively, channels could also be represented at runtime in global data share (GDS) SRAM structures or even into local data share (LDS) on a core-by-core basis to permit some degree of thread persistence to provide a tradeoff against memory bandwidth.

Efficient handling of event triggers can be farther promoted through the implementation of a hardware scheduling system, such as a scaled-up version of the control processor on current GPUs, in accordance with an embodiment of the invention. The scheduling system is configured to watch events and trigger kernel launches from hardware with minimal latency and high efficiency, allowing rapid launching of small consumer blocks.

As previously described, implementation details throughout this disclosure have generally been in the context of the OpenCL programming model. However, the advantages provided by this disclosure can be realized in other programming models. A similar example to the one described above implemented in an alternative programming model is as follows:

```
#include <cmath>
#include <string>
#include <stdio.h>
#include <iostream>
#include <opp.hpp>
#include <atomic>
namespace {
   const unsigned int N            = 10;
   const unsigned int PACKET_SIZE  = 5;
   const unsigned int CHANNEL_SIZE = 5;
};
void mainChannel(int argc, char ** argv)
{
   std::cout << "\n\n******************\n******************\n";
   std::cout << "CHANNEL TEST\n";
   atomic_int sumB = 0;
   atomic_int sumC = 0;
   opp::Pointer<int> a = opp::malloc<int>(N);
   for (unsigned int i = 0; i <= N; i++) {
      *(a+i) = i+1;
   }
   std::function<bool (opp::Channel<int>*)> predicate =
      [ ] (opp::Channel<int>* c) -> bool __device(fgl) {
         return c->size( ) % PACKET_SIZE == 0;
      };
   opp::Channel<int> b(N);
   b.executeWith(
      predicate,
      opp::Range<1>(CHANNEL_SIZE),
         [&sumB] (opp::Index<1>) __device(opp) {
            sumB++;
         });
   opp::Channel<int> c(N);
   c.executeWith(
      predicate,
      opp::Range<1>(CHANNEL_SIZE),
         [&sumC] (opp::Index<1>, const int v) __device(opp) {
            sumC += v;
         });
   opp::parallelFor(
      opp::Range<1>(N),
      [a, &b, &c] (opp::Index<1> index) __device(opp) {
         unsigned int n = *(a+index.getX( ));
         if (n > 5) {
            b.write(n);
         }
         else {
            c.write(n);
         }
      });
   std::cout << "sumB = " << sumB << std::endl;
   std::cout << "sumC = " << sumC << std::endl;
   opp::free(a);
   std::cout << "\n\n**********\n\n";
   std::cout << "END CHANNEL TEST\n";
   std::cout << "******************\n******************\n\n";
}
```

Figure 6:
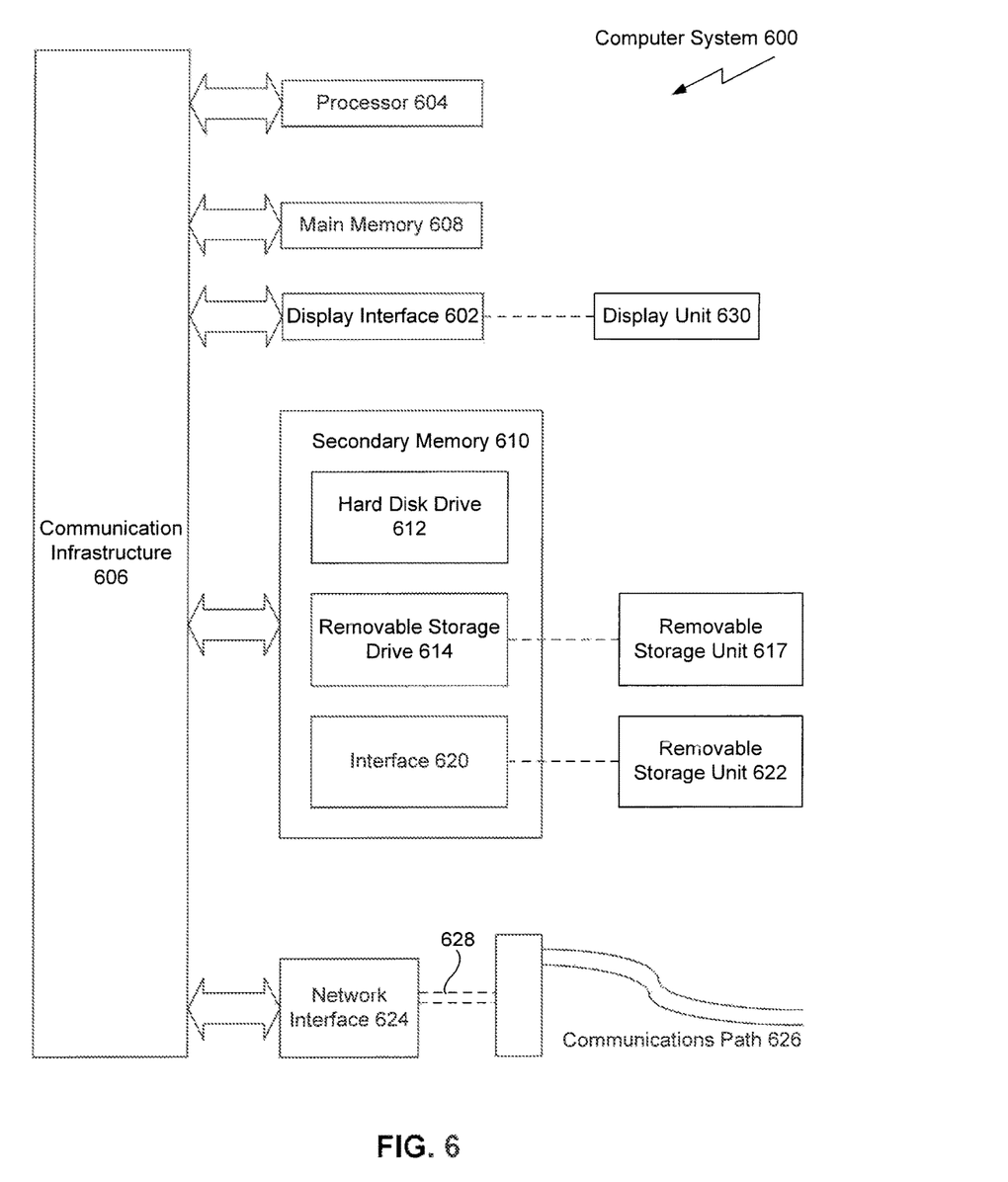
FIG. 6 depicts an example computer system in which embodiments of the invention may be implemented.

Various aspects of the invention can be implemented by software, firmware, hardware, or a combination thereof. FIG. 6 illustrates an example computer system 600 in which the invention, or portions thereof, can be implemented as computer-readable code. For example, the methods illustrated by flowcharts 300 of FIG. 3, 400 of FIG. 4, and 500 of FIG. 5, can be implemented in system 600. Various embodiments of the invention are described in terms of this example computer system 600. After reading this description, it will become apparent to a person skilled in the relevant art how to implement the invention using other computer systems and/or computer architectures.

Computer system 600 includes one or more processors, such as processor 604. Processor 604 can be a special purpose or a general purpose processor. Processor 604 is connected to a communication infrastructure 606 (for example, a bus or network).

Computer system 600 also includes a main memory 608, preferably random access memory (RAM), and may also include a secondary memory 610. Secondary memory 610 may include, for example, a hard disk drive 612, a removable storage drive 614, and/or a memory stick. Removable storage drive 614 may comprise a floppy disk drive, a magnetic tape drive, an optical disk drive, a flash memory, or the like. The removable storage drive 614 reads from and/or writes to a removable storage unit 617 in a well-known manner. Removable storage unit 617 may comprise a floppy disk, magnetic tape, optical disk, etc. that is read by and written to by removable storage drive 614. As will be appreciated by persons skilled in the relevant art(s), removable storage unit 617 includes a computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage wits 622 and interfaces 620 that allow software and data to be transferred from the removable storage unit 622 to computer system 600.

Computer system 600 may also include a display interface 602. The display interface 602 may be connected to a display unit 630.

Computer system 600 may also include a communications interface 624. Communications interface 624 allows software and data to be transferred between computer system 600 and external devices. Communications interface 624 may include a modem, a network interface (such as an Ethernet card), a communications port, a PCMCIA slot and card, or the like. Software and data transferred via communications interface 624 are in the form of signals 628 that may be electronic, electromagnetic, optical, or other signals capable of being received by communications interface 624. These signals 628 are provided to communications interface 624 via a communications path 626. Communications path 626 carries signals and may be implemented using wire or cable, fiber optics, a phone line, a cellular phone link, an RF link or other communications channels. As will be appreciated, computer system 600 may be embodied in a number of different form factors or types of computer systems. For example, aspects of the invention may be embodied in handheld or other mobile computing systems, set top boxes, conventional computers (e.g., laptops, desktops, servers), tablets, embedded systems, televisions, audio/video equipment, and the like. Computer systems embodying aspects of the invention may, in certain scenarios, result in reduced expenses (e.g., reduced or more efficient processing, reduced time to completion, reduced power, and the like).

In this document, the terms "computer program medium" and "computer usable medium" are used to generally refer to media such as removable storage unit 618, removable storage unit 622, and a hard disk installed in hard disk drive 612. Signals carried over communications path 626 can also embody the logic described herein. Computer program medium and computer usable medium can also refer to memories, such as main memory 608 and secondary memory 610, which can be memory semiconductors (e.g. DRAMs, etc.). These computer program products are means for providing software to computer system 600.

Computer programs (also called computer control logic) are stored in main memory 608 and/or secondary memory 610. Computer programs may also be received via communications interface 624. Such computer programs, when executed, enable computer system 600 to implement the invention as discussed herein. In particular, the computer programs, when executed, enable processor 604 to implement the processes of the invention, such as the steps in the methods illustrated by flowcharts 300 of FIG. 3, 400 of FIG. 4, and 500 of FIG. 5, discussed above. Accordingly, such computer programs represent controllers of the computer system 600. Where the invention is implemented using software, the software may be stored in a computer program product and loaded into computer system 600 using removable storage drive 614, interface 620, hard drive 612 or communications interface 624.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

While various embodiments of the invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the invention should not be limited by any of the above-described exemplary embodiments, but should be defined only in accordance with the following claims and their equivalents.

What is claimed is:

1. A method for performing multithreaded computing comprising:
   defining a producer kernel;
   defining a consumer kernel;
   defining one or more channels between the producer kernel and the consumer kernel, wherein the producer kernel is configured to write data to the one or more channels, and wherein the consumer kernel is configured to read the data from the one or more channels;
   registering one or more channel events, wherein each channel event is associated with a channel of the one or more channels and each channel event is registered to launch the consumer kernel in response to a channel condition of the associated channel being satisfied;
   in response to detecting that the channel condition of the channel associated with the channel event is satisfied, the channel event associated with the data, launching the consumer kernel from a state in which the consumer kernel is not yet instantiated to consume the data from the channel associated with the channel event of the one or more channel events in response to the channel condition of the channel associated with the channel event being satisfied, wherein the consumer kernel is launched only when needed in response to the channel condition of the channel associated with the channel event to prevent blocking of the consumer kernel and use of system resources;

reading and consuming the data from the channel associated with the channel event at the consumer kernel; and terminating the consumer kernel upon completion of the reading and consuming of the data from the channel associated with the channel event in order to free the system resources.

2. The method of claim 1, wherein the channel condition of the channel associated with the channel event is satisfied when at least one block of the data is in the channel.

3. The method of claim 1, wherein the channel condition of the channel associated with the channel event is satisfied when the channel associated with the channel event is full.

4. The method of claim 1, further comprising: allocating the one or more channels at runtime to a memory unit of a processing unit.

5. The method of claim 1, further comprising: executing a hardware scheduling system configured to watch the one or more channel events and trigger the launch of the consumer kernel.

6. The method of claim 1, further comprising: placing the consumer kernel in a command queue when the channel condition is satisfied, wherein the command queue is configured to handle the launch of the consumer kernel.

7. A non-transitory computer-readable storage device having instructions stored thereon for performing multithreaded computing, execution of which, by a computing device, causes the computing device to perform operations comprising:

defining a producer kernel;

defining a consumer kernel;

defining one or more channels between the producer kernel and the consumer kernel, wherein the producer kernel is configured to write data to the one or more channels, and wherein the consumer kernel is configured to read the data from the one or more channels;

registering one or more channel events, wherein each channel event is associated with a channel of the one or more channels and each channel event is registered to launch the consumer kernel in response to a channel condition being satisfied;

in response to detecting that the channel condition of the channel associated with the channel event is satisfied, launching the consumer kernel from a state in which the consumer kernel is not yet instantiated to consume the data from the channel associated with the channel event of the one or more channel events in response to the channel condition of the channel associated with the channel event being satisfied, wherein the consumer kernel is launched only when needed in response to the channel condition of the channel associated with the channel event to prevent blocking of the consumer kernel and use of system resources;

reading and consuming the data from the channel associated with the channel event at the consumer kernel; and terminating the consumer kernel upon completion of the reading and consuming of the data from the channel associated with the channel event in order to free the system resources.

8. The non-transitory computer-readable storage device of claim 7, wherein the channel condition of the channel associated with the channel event is satisfied when at least one block of the data is in the channel.

9. The non-transitory computer-readable storage device of claim 7, wherein the channel condition of the channel associated with the channel event is satisfied when the channel associated with the channel event is full.

10. The non-transitory computer-readable storage device of claim 7, the operations further comprising: allocating the one or more channels at runtime to a memory unit of a processing unit.

11. The non-transitory computer-readable storage device of claim 7, the operations further comprising: executing a hardware scheduling system configured to watch the one or more channel events and trigger the launch of the consumer kernel.

12. The non-transitory computer-readable storage device of claim 7, the operations further comprising: placing the consumer kernel in a command queue when the channel condition of the channel associated with the channel event is satisfied, wherein the command queue is configured to handle the launch of the consumer kernel.

13. A system comprising: a memory configured to store modules comprising:

a producer kernel configured to write data to one or more channels, a consumer kernel configured to read the data from the one or more channels, a module configured to define the one or more channels, and a registration module configured to register one or more channel events, wherein each channel event is associated with a channel of the one or more channels and each channel event is registered to launch the consumer kernel in response to a channel condition being satisfied; and one or more processors configured to process the modules;

wherein the consumer kernel is further configured to be launched in response to detecting that the channel condition of the channel associated with the channel event is satisfied, from a state in which the consumer kernel is not yet instantiated to consume the data from the channel associated with the channel event of the one or more channel events in response to the channel condition of the channel associated with the channel event being satisfied, the consumer kernel being launched only when needed in response to the channel condition of the channel associated with the channel event to prevent blocking of the consumer kernel and use of system resources, and to terminate upon completion of the reading and consuming of the data from the channel associated with the channel event in order to free the system resources.

14. The system of claim 13, wherein the condition of the channel associated with the channel event is satisfied when at least one block of the data is in the one or more channels.

15. The system of claim 13, wherein the channel condition of the channel associated with the channel event is satisfied when the channel associated with the channel event is full.

16. The system of claim 13, the modules further comprising: an allocation module configured to allocate the one or more channels at runtime to a memory unit of the one or more processors.

17. The system of claim 13, further comprising: a hardware scheduling system configured to watch the one or more channel events and trigger the launch of the consumer kernel.

18. The system of claim 13, the modules further comprising: a command queue configured to receive the consumer kernel when the channel condition of the channel associated with the channel event is satisfied and to handle the launch of the consumer kernel.

* * * * *